US011216892B1

(12) United States Patent
Harris et al.

(10) Patent No.: US 11,216,892 B1
(45) Date of Patent: Jan. 4, 2022

(54) CLASSIFYING AND UPGRADING A CONTENT ITEM TO A LIFE EVENT ITEM

(71) Applicant: Facebook, Inc., Menlo Park, CA (US)

(72) Inventors: David Abraham Harris, San Francisco, CA (US); Caroline Yvonne Lo, Palo Alto, CA (US); Diego Feijer, Redwood City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 320 days.

(21) Appl. No.: 16/212,564

(22) Filed: Dec. 6, 2018

(51) Int. Cl.
*G06Q 50/00* (2012.01)
*G06F 16/958* (2019.01)
*G06F 16/45* (2019.01)
*G06F 16/435* (2019.01)

(52) U.S. Cl.
CPC ........... *G06Q 50/01* (2013.01); *G06F 16/435* (2019.01); *G06F 16/45* (2019.01); *G06F 16/958* (2019.01)

(58) Field of Classification Search
CPC ....... G06Q 50/01; G06F 16/958; G06F 16/45; G06F 16/435
See application file for complete search history.

(56) References Cited

U.S. PATENT DOCUMENTS

| 2008/0086475 A1* | 4/2008 | Kane | G06F 16/958 |
| 2011/0099133 A1* | 4/2011 | Chang | G06F 16/353 706/12 |
| 2012/0016948 A1* | 1/2012 | Sinha | G06Q 10/10 709/207 |
| 2015/0058324 A1* | 2/2015 | Kauwe | G06F 16/284 707/722 |
| 2015/0234806 A1* | 8/2015 | Bhagwan | G06F 40/279 705/7.18 |
| 2015/0326522 A1* | 11/2015 | Pu | G06Q 50/01 726/26 |
| 2015/0334168 A1* | 11/2015 | Kosslyn | H04L 67/10 709/204 |
| 2016/0012053 A1* | 1/2016 | Weening | G06Q 10/107 707/723 |

(Continued)

OTHER PUBLICATIONS

• Gruhl, Daniel, et al. "Information diffusion through blogspace." Proceedings of the 13th international conference on World Wide Web. 2004. (Year: 2004).*

*Primary Examiner* — Richard W. Crandall
*Assistant Examiner* — Corey Russ
(74) *Attorney, Agent, or Firm* — Fenwick & West LLP

(57) ABSTRACT

An online system receives a content item from a user and provides the content item for display to the user's connections. The online system receives interactions performed by the user's connections with the content item. From the content item and the interactions, the online system extracts features to be input into a model. The model is trained to determine whether the content item should be classified as a life event and in which category. Based on output from the model, the online system classifies the content item as a life event in a particular category and provides an option to the user to upgrade the content item into a life event item of the particular category. Upon receiving the user's agreement to upgrade, the online system generates a life event item specific to the particular category and provides the life event item for display to the user's connections.

20 Claims, 6 Drawing Sheets

(56) References Cited

U.S. PATENT DOCUMENTS

| | | | |
|---|---|---|---|
| 2016/0034712 A1* | 2/2016 | Patton | H04L 51/16 |
| | | | 726/28 |
| 2016/0162456 A1* | 6/2016 | Munro | G06F 16/288 |
| | | | 704/9 |
| 2016/0277326 A1* | 9/2016 | Sherrets | H04L 67/22 |
| 2016/0378760 A1* | 12/2016 | Braz | G06Q 10/107 |
| | | | 707/728 |
| 2017/0134333 A1* | 5/2017 | Peterson | H04L 51/12 |
| 2017/0154314 A1* | 6/2017 | Mones | G06F 16/2462 |
| 2017/0193075 A1* | 7/2017 | Hegelich | G06N 20/00 |
| 2017/0302610 A1* | 10/2017 | Naidu | H04L 51/16 |
| 2018/0308133 A1* | 10/2018 | Geist, Jr. | G06N 20/00 |
| 2020/0073925 A1* | 3/2020 | Shapiro | G06F 40/186 |
| 2020/0226179 A1* | 7/2020 | Novikoff | G06F 16/58 |

* cited by examiner

CLASSIFYING AND UPGRADING A CONTENT ITEM TO A LIFE EVENT ITEM

BACKGROUND

This disclosure relates generally to online content delivery and, in particular, to classifying a content item posted by a user into a life event category and generating a life event item from the content item.

Online systems have become increasingly prevalent in digital content distribution and consumption, and they allow users to more easily communicate with one another. Users of online systems, such as social networking systems, may associate with other online system users, forming a web of connections. Additionally, users may share personal information and other stories with other users connected to them via an online system. Examples of information shared by online system users include videos, music, contact information, background information, job information, interests, photos, notes, and/or other member-specific data.

Online systems store content items, such as video files, audio files, pictures, documents, etc., for presenting to users of the online system. These content items can be created by the online system, uploaded by online system users, or received from third parties. Online system users may interact with content items presented to them in various ways. For example, an online system user may access, express reaction to, comment on, share, or hide content items presented to them.

An online system may wish to promote engagement of users with one another and with online content. Current existing methods allow users to post content items and interact with content items. However, there is a limited ability to determine which content items are associated with particularly important events such that other users will not want to miss those content items and will be most likely to engage with them.

SUMMARY

In various embodiments of the invention, an online system uses machine learning techniques to determine whether a content item should be classified as being associated with a particularly important event for a user (e.g., a life event of the user, such as a marriage, birth of a child, graduation, etc.), and if so, in which category (e.g., marriage category, new baby category, etc.). Based on the determination, the online system generates a revised content item that is designed around highlighting the important event (e.g., a life event item or story) that is specific to the particular category. The key event or life event item can include at least some content from the content item.

In one example, the online system receives a content item from a posting user that posted the content item within the online system. The content item can include an image, video, text, or other data that a user may wish to share. The online system can provide the content item for display to the posting user and other users that are connected to the posting user in the online system. The online system receives interactions performed by the posting user's connections with the content item. The interaction can include comments made by the posting user's connections on the content item, reactions of the posting user's connections to the content item (e.g., indicated by the user selecting a reaction icon), or other interactions. From the content item and interactions, the online system extracts features, such as keywords in the content item, keywords in comments, number of comments, types of reactions, number of reaction icons, etc. The online system inputs the extracted features into a machine learning model. The machine learning model, when applied to features of a content item, determines whether the content item should be classified as, for example, a life event in one of a plurality of categories (such as work, relationship, education, family, etc.). In response to a determination that the content item from the posting user should be classified as a life event in a particular category, the online system provides to the posting user with an option to upgrade the content item into a life event item specific to the particular category. Upon receiving the user's agreement to upgrade the content item, the online system generates a life event item or story from the content item that includes at least some content from the content item that was originally posted by the user in addition to other content created or added by the online system to highlight the life event.

The online system can also provide candidate content that the online system has automatically collected/assembled for the posting user to select from and add into the life event item. The candidate content can be content generated by the online system, content received from other users, content received from third party systems, and/or historical content received from the posting user. Alternatively or additionally, the online system can allow the posting user to add other new content into the life event item or post that is being generated. The online system provides the life event item that the system has now generated for display to the posting user and at least some of the posting user's connections. The online system may select one or more users who have strong affinity with the posting user and send the selected users a notification of the life event item given that the life event may be one that closer friends/family may be particularly interested in being aware of. The online system may also update a status posting user based on the life event item, e.g., in a user profile of the posting user, either automatically or after requesting user approval of the update.

With this invention, the online system highlights the life event indicated in the content item by creating the life event post. The online system updates connections of the posting user about the life event so that the posting user does not have to contact each of his connections individually. This encourages the posting user's connection to engage with the life event item and share in the celebration or commemoration. And, the online system keeps a record of important moments for posting user and also grows the posting user's presence in the online system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
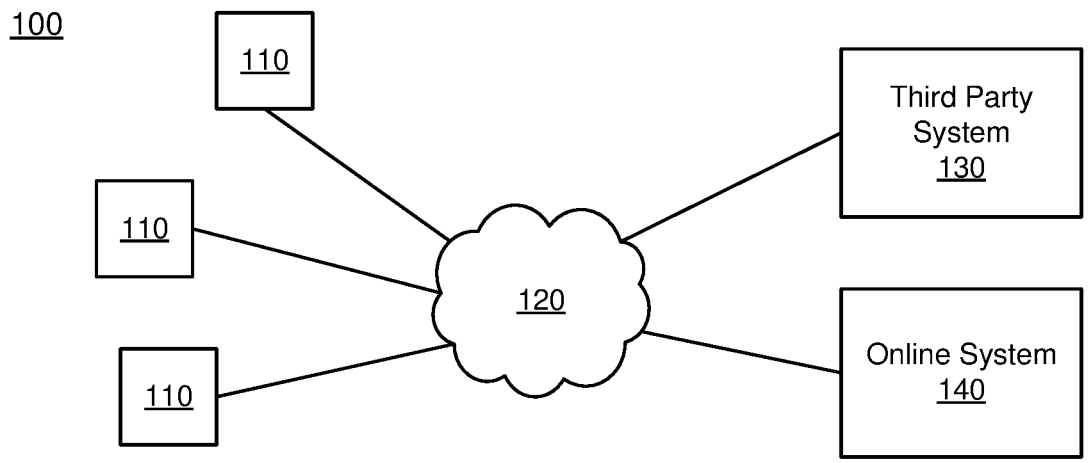
FIG. 1 is a block diagram of a system environment in which an online system operates, in accordance with an embodiment.

FIG. 1 is a block diagram of a system environment 100 in which an online system 140 operates, in accordance with an embodiment. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate with one or more third party systems 130 and the online system 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
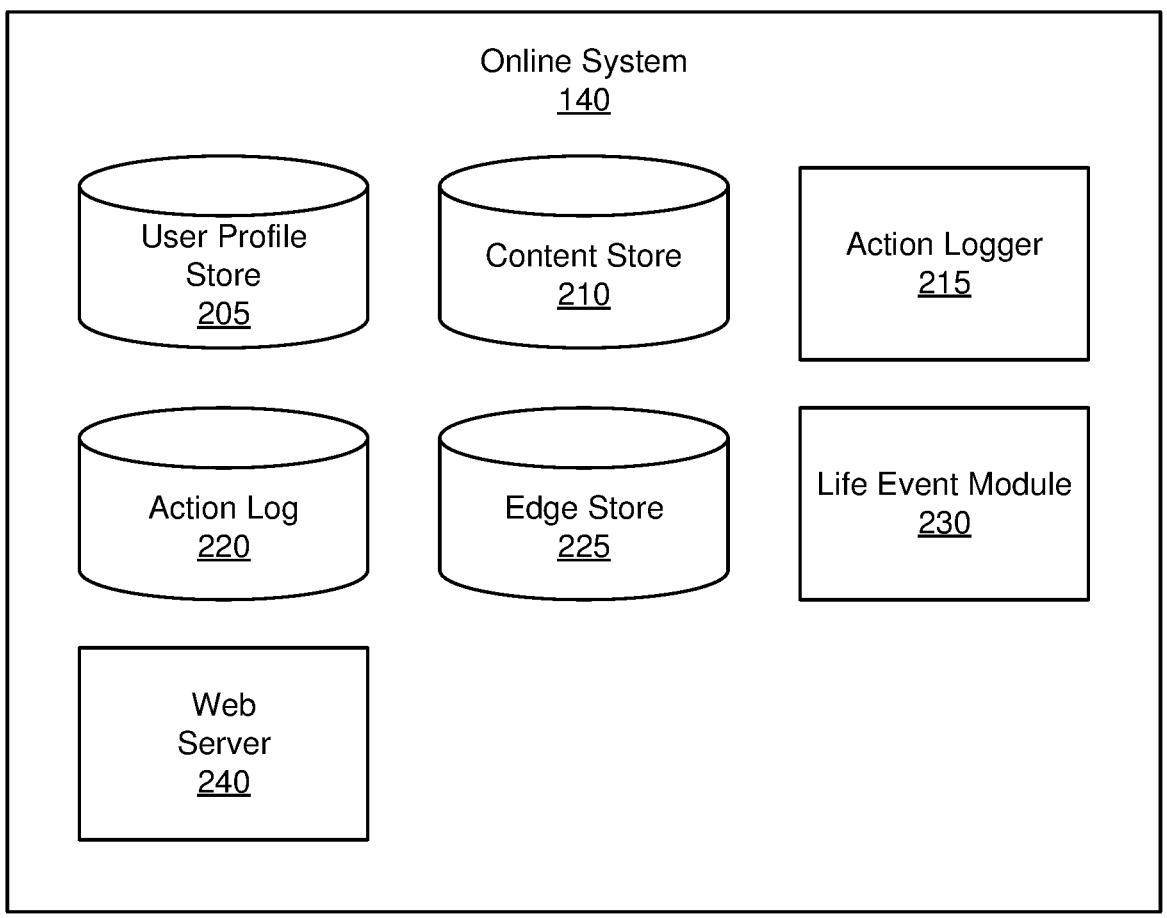
FIG. 2 is a block diagram of the online system in which a life event module operates, in accordance with an embodiment.

FIG. 2 is a block diagram of the online system 140 in which a life event module 230 operates, in accordance with an embodiment. The online system 140 shown in FIG. 2 includes a user profile store 205, a content store 210, an action logger 215, an action log 220, an edge store 225, the life event module 230, and a web server 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220. A user profile may also include identification information of the user, including a user name, an email address, a physical address, a number, an image, or any combination thereof.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The content store 210 stores content items for presentation to a user. Content of a content item can be text, image, audio, video, or any other suitable data presented to a user. In various embodiments, the content of a content item also specifies a page of content. For example, a content item includes a landing page specifying a network address of a page of content to which a user is directed when the content item is accessed.

In some embodiments, a content item is associated with a bid amount, such as when it is a content item sponsored by an entity. The bid amount is included in the content item by a user and is used to determine an expected value, such as monetary compensation, provided by an advertiser to the online system 140 if the content item is presented to a user, if the content item receives a user interaction when presented, or if any suitable condition is satisfied when the content item is presented to a user. For example, the bid amount included in a content item specifies a monetary amount that the online system 140 receives from a user who provided the content item to the online system 140 if the content item is displayed. In some embodiments, the expected value to the online system 140 of presenting the content item may be determined by multiplying the bid amount by a probability of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information.

Various sponsored content items may include an objective identifying an interaction that a user sponsoring the content item desires other users to perform when presented with content included in the content item. Example objectives include: installing an application associated with a content item, indicating a preference for a content item, sharing a content item with other users, interacting with an object associated with a content item, or performing any other suitable interaction. The online system 140 logs interactions between users presented with the content item or with objects associated with the content item. Additionally, the online system 140 receives compensation from a user sponsoring a content item as online system users perform interactions with a content item that satisfy the objective included in the content item.

Additionally, a content item may include one or more targeting criteria specified by the user who provided the content item to the online system 140, such as a target group for a sponsored content item. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these user interactions is stored in the action log 220. Examples of user interactions with objects include: commenting on posts, sharing links, checking-in to physical locations via a client device 110, accessing content items, and any other suitable interactions. Additional examples of user interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were interacted, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The life event module 230 generates a life event item that includes content of a content item posted by a user (i.e., the posting user) within the online system (e.g., displayed in a newsfeed). The description refers to "life event" throughout but this can include various types of important or key events or moments for a user that a user may wish to share with the user's social network. The life event item or story is specific to a category in which the life event module 230 classifies the content item as a type of life event. Initially, the online system 140 receives a content item posted by a user that may or may not be a more important or life event item, and the system provides the content item for display to the posting user and other users of the online system 140 (such as the posting user's connections). The online system 140 receives interactions performed by connections of the posting user over a period of time. For instance, the posting user's connections may comment on the content item or select reaction icons representing their reactions to the content item (such as like, love, amusement, astonishment, sad, or angry). The interactions are stored in the action log 220

To determine whether the content item may be related to a life event or important enough to be upgraded, the life event module 230 retrieves the content item from the content store 210 and also retrieves the various interactions with the content item that have occurred over time from the action log 220. Based on the content item and these interactions, the life event module 230 determines whether the content item represents a life event in one or a plurality of categories. For example, the life event module 230 extracts features from the content item and interactions and inputs the features into a machine learning model configured to classify the content item. Examples of the extracted features include keywords in the content item, objects in the content item, keywords in comments, number of comments, types of reactions, number of reaction icons, and characteristics of users who interacted with the content item. The machine learning model is configured to take the extracted features as input and output a determination of whether the content item should be classified as a life event in one of a plurality of categories. Examples of the categories include work, relationship, travel, education, family, bucket list, home, living, health, achievement, interest, and activities. In other embodiments, the categories are specific life event categories, such as marriage, new baby, graduation, family trip, new job, etc. In some embodiments, the plurality of categories are determined based on a geographical region associated with the posting user. For example, health could be one of the plurality of categories for a posting user in Germany but might not be any of the plurality of categories for a user in another country. In some embodiments, the machine learning model determines a score for each category. The score indicates whether the content item should be classified as a life event in the category. The life event module 230 classifies the content item as a life event in a category having a score exceeds a threshold value or having the highest score.

Further, the life event module 230 seeks the user's permission or offers to the user to upgrade the content item into a life event of the particular category. For example, the life event module 230 provides to the posting user a user interface that allows the posting user to say yes or no to the upgrade. Upon receiving the posting user's agreement to upgrade the content item, the online system generates a life event item or story for the posting user. The life event item is specific to the particular category. For example, content of the life event item has a theme representing the particular category. The content of the life event item can include at least some of the content from the content item posted by the user and can also include other content, such as content generated by the life event module 230, content from historical content items from the posting user, content from third party systems 130, and/or content from other users. The life event module 230 may add into the life event item an entity (e.g., an individual, a company/employer, a school, etc.) that is involved in the life event.

The life event module 230 then provides the life event item for display to the posting user and at least some of the posting user's connections, e.g., in a newsfeed of content. The life event module 230 may replace the content item that was originally posted by the posting user with the new life event item that is designed to emphasize the life event. For example, it may include a special life event icon or banner that indicates it as a life event, it may have special animations related to it, it may have various new photos added relating to the life event and/or text about the event, it may include additional interaction features like new reaction icons or features that signify celebration of the event, it may include photos that slowly zoom in or out while being viewed to emphasize the scene or people in the photo, etc. The life event module 230 can provide the life event item for display through various channels, such as newsfeed, user profile, story board, email, and message. The life event module 230 may allow the posting user to select one or more of the channels to present the life event item. In some embodiments, the life event module 230 also sends notification of the life event item to one or more users who have strong affinity with the posting user. The one or more users can be identified by the posting user or selected by the life event module 230. Additionally or alternatively, the life event module 230 may update a user profile of the posting user based on the life event item. More details about the life event module 230 are described in conjunction with FIG. 3.

The web server 250 links the online system 140 via the network 120 to the one or more client devices 110, as well as to the one or more third party systems 130. The web server 250 serves web pages, as well as other content, such as JAVA®, FLASH®, XML and so forth. The web server 250 may receive and route messages between the online system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, or BlackberryOS.

Life Event Item Generation

Figure 3:
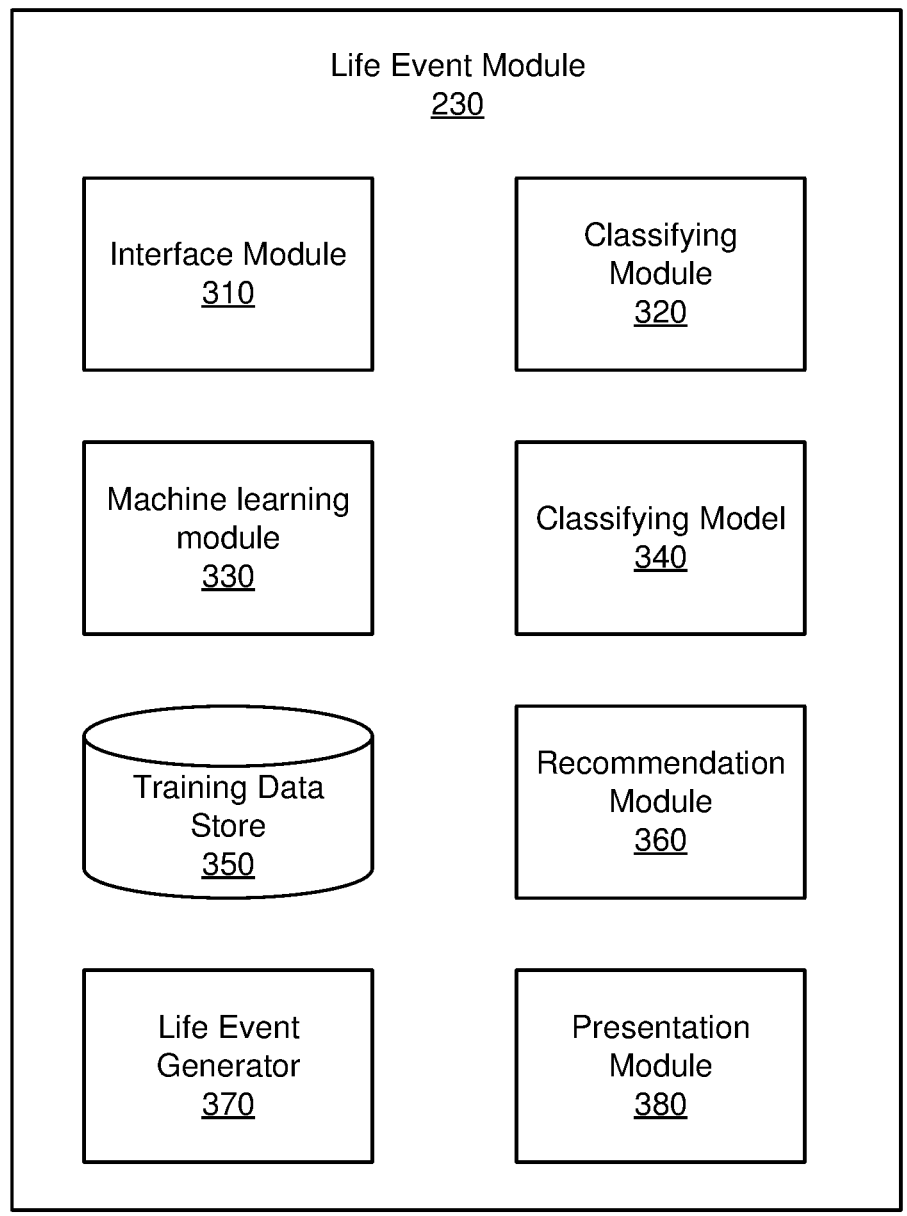
FIG. 3 is a block diagram of the life event module, in accordance with an embodiment.

FIG. 3 is a block diagram of the life event module 230, in accordance with an embodiment. As discussed above, the life event module 230 classifies a content item (i.e., target content item) from a posting user as a life event in a particular category and generates a life event item that is specific to the particular category. The life event module 230 in the embodiment of FIG. 3 includes an interface module 310, a classifying module 320, a machine learning module 330, a classifying model 340, a training data store 350, a recommendation module 360, a life event generator 370, and a presentation module 380. In other embodiments, the content distribution module 230 may include additional, fewer, or different components for various applications.

The interface module 310 facilitates communication of the life event module 230 with other entities. For example, the interface module 310 can forward the generated life event item to the web server 240 for display to the posting user and the posting user's connections. As another example, the interface module 310 obtains information for generating the life event item. For instance, the interface module 310 retrieves content items (including the target content item) from the content store 210 and retrieves user interactions with the target content item from the action log 220.

Figure 4:
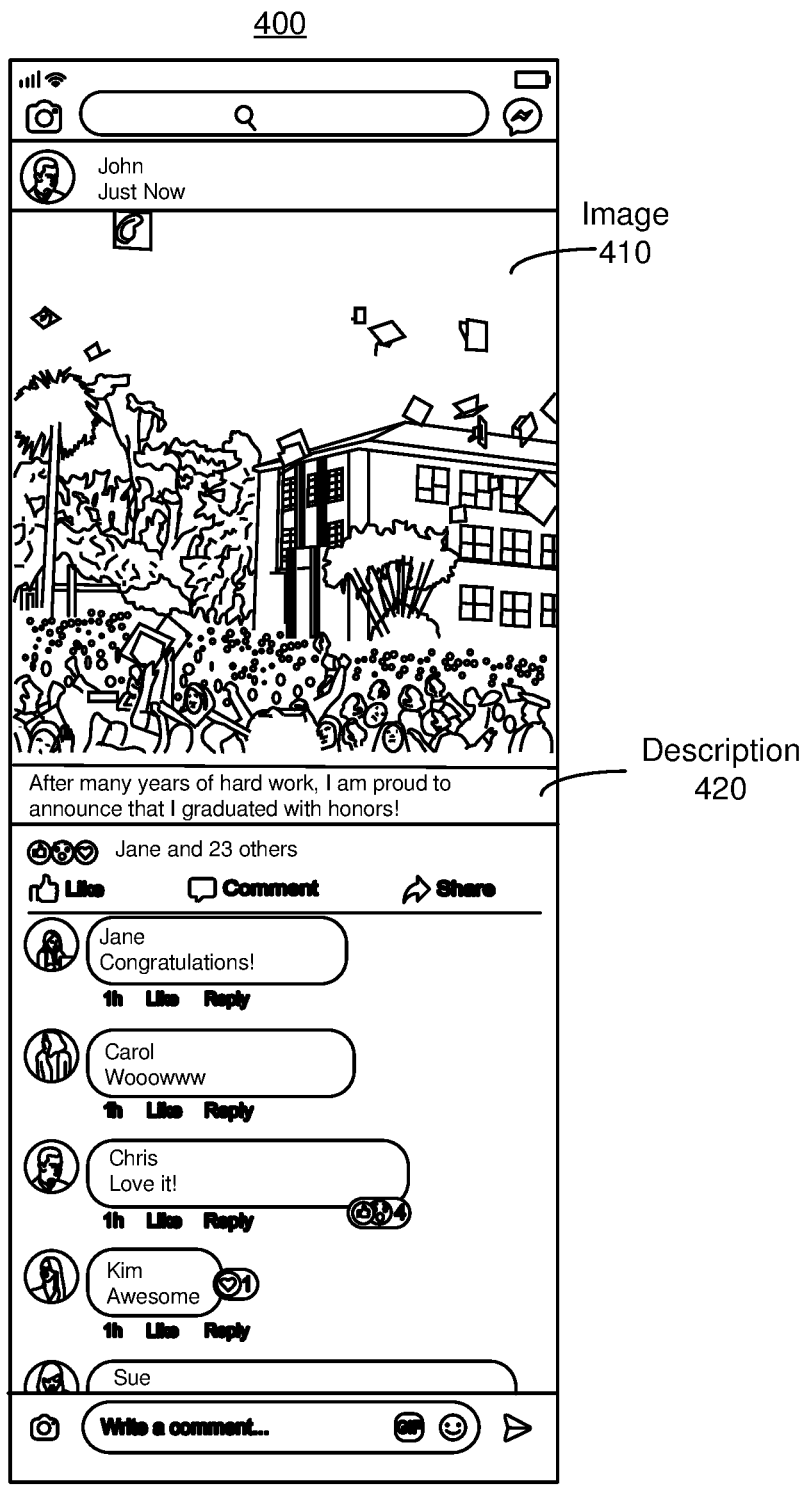
FIG. 4 shows an example content item and user interactions with the content item 400, in accordance with an embodiment.

FIG. 4 shows an example content item 400 and user interactions with the content item 400, which might be managed by the interface module 310, in accordance with an embodiment. The content item 400 includes an image 410 and a description 420. This example shows the content item after a viewing user has clicked or selected the link (e.g., from a newsfeed) to view the content item such that the user can then scroll through the photos, description, and comments. The image 410 shows a group of students wearing graduation gowns and throwing graduation caps in the air, indicating that the image is a photo of graduation. The description 420 reads, "[a]fter many years of hard work, I am happy to announce that I graduated with honors. Thank you to my friends and family who supported me along the way. I couldn't have done it without you." The content item 400 have received two types of user interactions: reactions and comments. As shown in FIG. 4, a plurality of users reacted to the content item 400 by selecting reaction icons representing like, love, and astonishment. Also, a plurality of users have made comments on the content item 400.

Referring back to FIG. 3, the classifying module 320 uses a classifying model 340 trained by the machine learning module 330 to determine whether the target content item should be classified as a life event and if yes, in which category. The machine learning module 330 applies machine learning techniques to train the classifying model 340. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments.

As part of the training of the classifying model 340, the machine learning module 330 forms a training set of content items and interactions with these content items. In some embodiments, the training set includes a positive training set of content items that have been classified as life events in various categories and a negative training set of content items that have not been classified as life events in any category. In one embodiment, the content items in the training set may be selected based on at least in part on their content or characteristics of users who posted them.

The machine learning module 330 extracts features from the content items of the training set and interactions with the content items, the features being variables deemed potentially relevant to whether or not a content items should be classified as a life event in a category. In some examples, the features extracted from a content item can include text included in the content item, an object included the content item, a person associated with the content item (e.g., an online system user tagged in the content item), text from comments made on the content item, number of comments made on the content item, types of reactions received by the content item, number of reaction icons received by the content item, and/or other types of interactions received by the content item. Taking the content item 400 in FIG. 4 for example, features extracted from the content item 400 can include objects extracted from the image 410 (such as the graduation gowns and graduation caps) and keywords extracted from the description 420 (such as "graduated" and "with honors"). The features can also include the types of reactions (i.e., like, love, and astonishment), numbers of these reaction icons, numbers of comments, and keywords extracted from the comments (such as "wooowwww" and "congratulations"). The machine learning module 330 trains the classifying model 340 with the features of the positive training set and in some embodiments, the negative training set serving as the inputs.

The classifying module 320 inputs features of the target content item into the classifying model 340. The classifying model 340, when applied to the features of the target content item, outputs an indicator of whether the target content item should be classified as a life event in a category. In some embodiments, the category is selected from a plurality of candidate categories, such as work, relationship, travel, education, family, bucket list, home, living, health, achievement, and interest and activities. In one embodiment, the indicator includes a score for each of the categories. The score can be a percentage from 0% to 100%, the percentage indicating a likelihood that the content item is related to a life event of the category. In another embodiment, the indicator can be in other forms, such as a text string or symbols indicating whether the content item should be classified as a life event and if yes, in which of the categories. For example, when applied to the content item 400 in FIG. 4, the classifying model 340 can output a score of 100% for the education category, indicating that the content item 400 should be classified as a life event (i.e., graduation) in the education category.

In response to a determination that the target content item from the posting user should be classified as a life event in a particular category, the recommendation module 360 recommends the posting user to upgrade the target content item into a life event item that represents the life event in the particular category. For example, the recommendation module 360 provides a user interface for display to the posting user. The user interface allows the posting user to elect whether to upgrade the target content item to a life event item specific to the particular category. The user interface may also allow the posting user to select whether to keep the content item or replace it with the life event item.

In some embodiments, upon the posting user elects to upgrade the content item, the life event generator 370 generates a life event item. The generated life event item includes a least some content of the target content item. Taking the content item 400 on FIG. 4 for example, a life event item generated based on the content item 400 can include a part or whole of the image 410, a part or whole of the description 420, and even part or all of the comments and reactions received by the content item 400. The life event generator 370 may re-arrange or edit content from the content item. For example, the life event generator 370 may change positions of the description 420 in relative to the image 410, e.g., by moving the description 410 to be on top of the image 410.

The life event generator 370 can also add other content items (i.e., additional content items) into the life event item. The additional content items are specific to the particular category. Examples of additional content items include content items generated by the online system 140, content items posted by other users, content item received from third party systems 130, and/or historical content items posted by the posting user into the life event item. For example, the life event generator 370 retrieves a plurality of animations from the content store 210 (through the interface module 310) and selects, from the retrieved animations, an animation that represents a theme of the particular category. As another example, the life event generator 370 identifies historical content items received from the posting user within a predetermined duration before receiving the target content item from the posting user and determines whether each historical content item is relevant to the particular category. Upon determining that a historical content item is relevant to the particular category, the life event generator 370 adds the historical content item into the life event item.

In some embodiments, the life event generator 370 uses a template to generate the life event item. The template includes a number of slots where the life event generator 370 can add the target content item and the additional content items. The slots in the template can have different weights, depending on size, location, appearance and/or other characteristics of the slots. The life event generator 370 may place the target content item into a slot having the highest weight and place the additional content items into other slots based on the relevance of the additional content items to the particular category.

In some embodiments the generation of the life event item may not need input from the posting user so that once the posting user elects to upgrade the target content item, the life event item is automatically generated by the life event generator 370. In some other embodiments, the life event generator 370 requires or asks for input from the posting user in the process of generating a life event item. For example, after the posting user elects to upgrade the target content item, the life event generator 370 provides options for the posting user to select content to be inserted into the life event item through a user interface. The user interface allows the posting user to post content items from a client device 110 or a third party system 130. Additionally or alternatively, the user interface provides candidate content items to the posting user, from which the posting user can select to add to the life event item. The candidate content items can include content items generated by the online system 140, content items posted by other users, content item received from third party systems 130, and/or historical content items posted by the posting user that are determined to be relevant.

Figure 5:
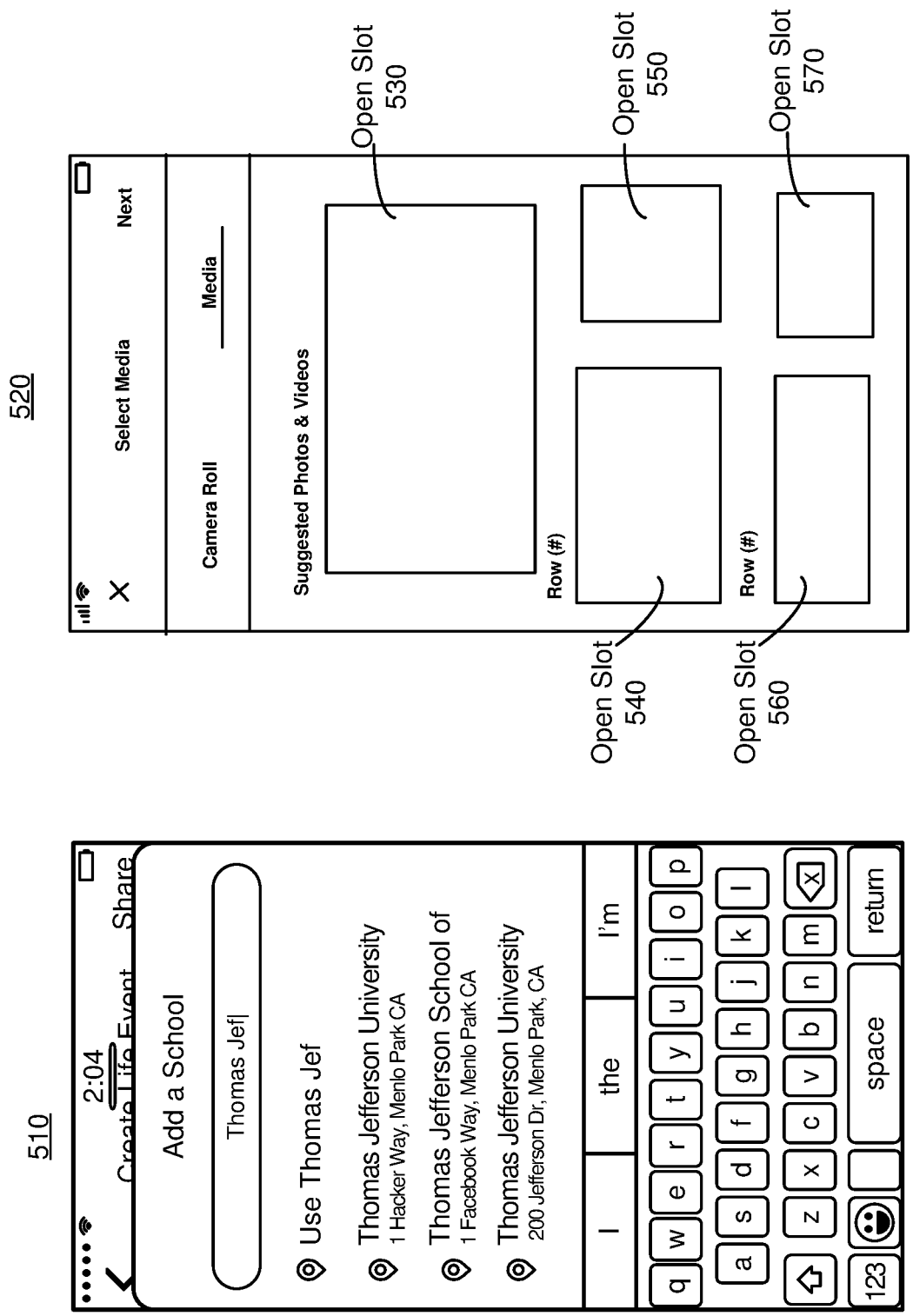
FIG. 5 shows examples of user interfaces that allow a use to add content into a life even story, in accordance with an embodiment.

FIG. 5 shows examples of user interfaces that allow the posting user to add content into a life even item, in accordance with an embodiment. FIG. 5 includes three user interfaces 510 and 520. The user interface 510 allows the posting user to add a school. Based on input from the posting user, the user interface 510 provides a list of candidate school options for the posting user to select. The user interface 520 includes open spots 530-570. The posting user is allowed to insert a content item into each open slot. For example, the posting user can upload a photo or video from the cameral roll of a mobile phone and insert it into an open slot. Alternatively, the user can select one of the suggested photos or videos to be inserted into an open slot. The life event generator 370 generates the life event item based on the target content item and the content items selected or added by the posting user.

Figure 6:
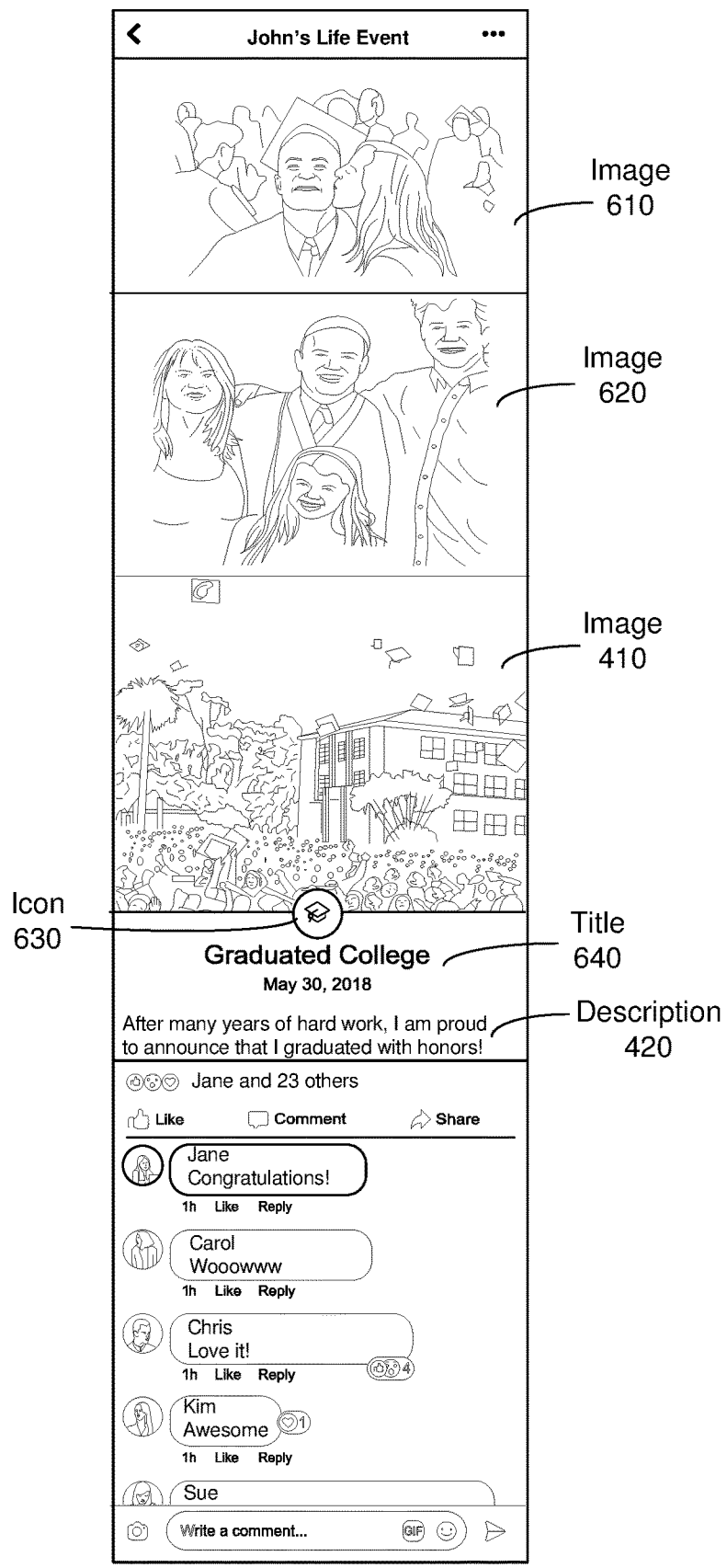
FIG. 6 shows an example of a life event post or story specific to a particular category in which the content item of FIG. 4 is classified as a life event, in accordance with an embodiment.

FIG. 6 shows an example of a life event post or story specific to a particular category in which the content item 400 of FIG. 4 is classified as a life event, in accordance with an embodiment. The life event item includes the image 410 of the content item 400, the description 420 of the content item, and the user interactions with the content item. The life event item includes two other images 610 and 620. In one embodiment, the images 610-620 are historical content items received from the posting user and are retrieved by the life event module 230 to be inserted into the life event item. In another embodiment, these three images are added to the life event item by the posting user. Additionally, the life event item also includes an icon 630 representing graduation and a title 640 indicating the life event. In one embodiment, the icon 630 is added to the life event item 700 by the life event module 230. The title 640 can either be generated by the life event module 230 based on the description 420 of the content item 400 or be input by the posting user.

FIG. 6 illustrates the life event item after a viewing user has clicked into it from a newsfeed or other viewing location such that the user can now scroll through the photos and comments. In some embodiments, the upgrade to a life event post adds animations to the photos such that the photos zoom in or out as the user views them. This can occur as the user scrolls through his newsfeed and sees the life event post there, or after the user clicks into the life event post to view it in more detail. The photos might zoom in slowly to better show people in photos and zoom out slowly to better show scenes in photos. Another upgrade animation can be an unwrapping or unraveling of photos as the user clicks into the content item such that a single photo is visible in the life event post in the newsfeed but a collection of photos unfold into a photo reel of multiple photos that the user can scroll through when the user selects the content item in the newsfeed. Similarly, the photos can fold back up when the user clicks back out of the content item to return to the newsfeed.

Referring back to FIG. 3, after the life event generator 370 generates the life event item, the presentation module 380 provides the life event item for display to the posting user and connection of the positing user. The life event item can be provided for display through various channels, including story board, newsfeed, email, and message. In some embodiments, the presentation module 380 provides a user interface to the posting user that allows the posting user to select one or more channels to present the life event item. Also, the presentation module 380 may select one or more connections of the posting user and send the selected connections a notification of the life event item. The one or more connections can be selected based on their affinity with the posting user and/or the target content item. The presentation module 380 may also update a status of the posting user in the posting user's user profile based on the life event item. For example, the presentation module 380 can update the education information of the posting user to show that the posting user has graduated from the school.

Figure 7:
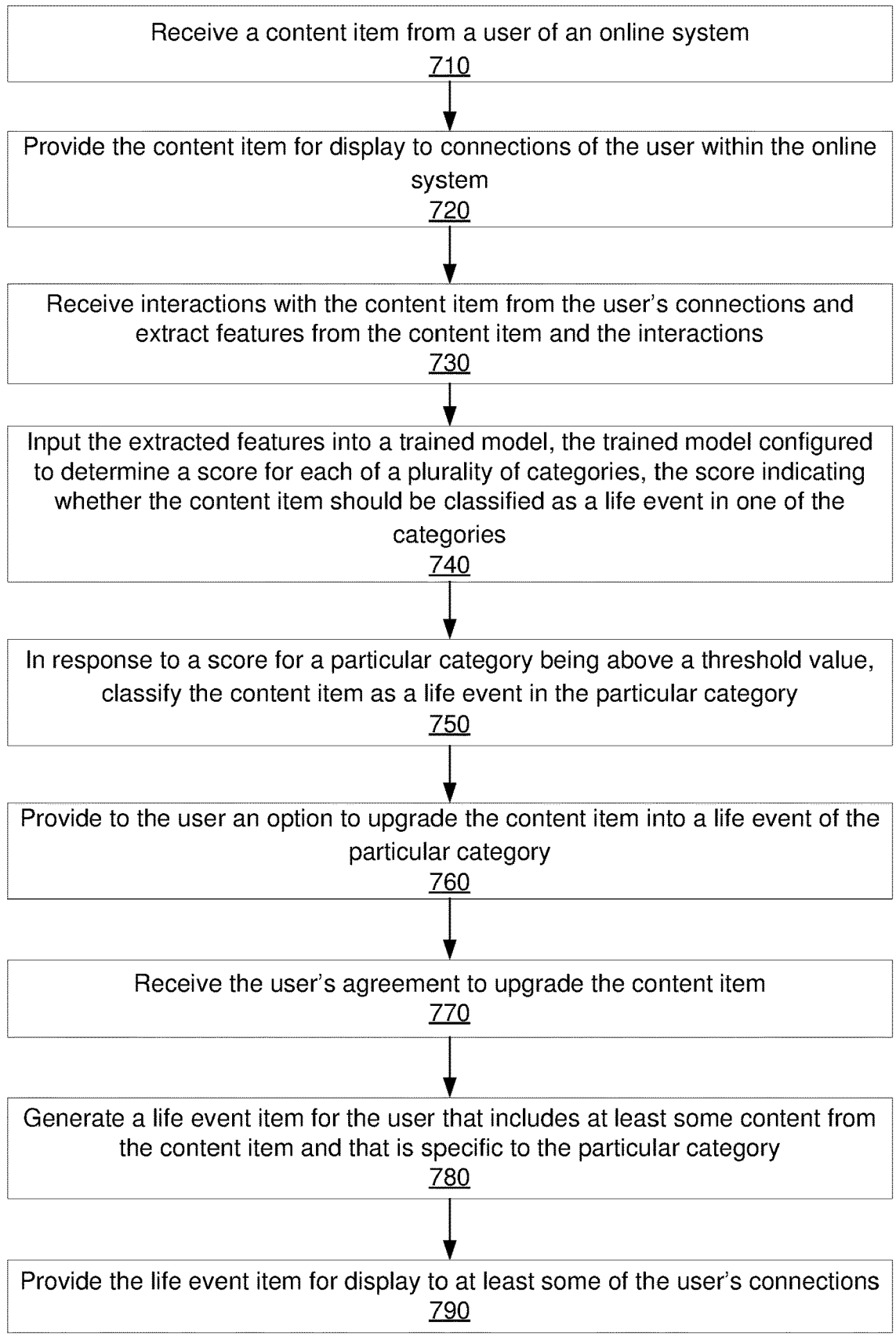
FIG. 7 is a flowchart illustrating a process of generating a life event item or story specific to a category in which a content item is classified as a life event, in accordance with an embodiment.

FIG. 7 is a flowchart illustrating a process of generating a life event item or story specific to a category in which a content item is classified as a life event, in accordance with an embodiment. In some embodiments, the process is performed by the life event module 230, although some or all of the operations in the method may be performed by other entities in other embodiments. In some embodiments, the operations in the flow chart are performed in a different order and can include different and/or additional steps.

The life event module 230 receives 710 a content item from a user of an online system. The life event module 230 provides 720 the content item for display to the user and connections of the user within the online system. The content item can be presented in a user interface, such as newsfeed, story board, or other types of channels. The user interface allows the user's connections to interact with the content item. For instance, the user's connections may comment on the content item or select reaction icons representing their reaction to the content item. The life event module 230 receives 730 interactions with the content item from the user's connections and extracts 730 features from the content item and the interactions. Features extracted from the content item can be keywords in the content item and objects shown in the content item. Features extracted from the interactions can be keywords in the interactions, types of the interactions, or number of the interactions. The life event module 230 inputs 740 the extracted features into a trained model. The trained model is configured to determine a score for each of a plurality of categories (e.g., family, work, education, etc.). The score indicates whether the content item should be classified as a life event in the category. In response to a score for a particular category being above a threshold value, the life event module 230 classifies 750 the content item as a life event in the particular category.

The life event module 230 provides 760 to the user an option to upgrade the content item into a life event of the particular category. The life event module 230 receives 770 the user's agreement to upgrade the content item. Further, the life event module generates 780 a life event item for the user. The life event item includes at least some content from the content item. Also, the life event item is specific to the particular category in a way that content of the life event item represents the particular category. The life event item may also include other content retrieved from the content store 210 that represents the category, such as historical content posted by the user, content created by other users, or content created by the online system 140 or a third party system 130. In one example, in response to the user's agreement to upgrade the content item, the life event module 230 generates the life event item and replaces the content item with the life event item. In another example, in response to the user's agreement to upgrade the content item, the life event module 230 provides candidate content to the user so that the user can select which content to add to the life event item. The life event module 230 can also provide a user interface to the user to create a life event item. The user interface can show a template with open slots, in which the user can add content either recommended by the life event module 230 or selected by the user.

The life event module 230 provides 790 the life event item for display to the user and at least some of the user's connections. The life event module 230 may update a status of the user in the user profile of the user indicating the life event. The life event module 230 may also send notifications to some of the user's connection of the life event item. Thus, the system automatically generates an upgraded content item to celebrate the life event of the user triggered by the system's classification that detects a content item to relate to a life event. The user can then share this life event with his social network without having to put in extra work to revise his own content item, as the system does this for him.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, by an online system, a content item from a user of the online system;
providing, by the online system, the content item for display to connections of the user within the online system;
receiving, by the online system, interactions with the content item from the user's connections;
extracting, by the online system, features from the content item and the interactions;
generating, by the online system using a machine learning technique, a trained model by:
forming a positive training set including a first group of content items that have been classified as life events in a plurality of categories and including interactions with the content items in the first group,
forming a negative training set including a second group of content items that have not been classified as life events in any of the plurality of categories and including interactions with the content items in the second group,
extracting training features from the positive training set and the negative training set, and
training the model by using the training features;
inputting, by the online system, the extracted features into the trained model, the trained model configured to determine a score for each of the plurality of categories, the score indicating whether the content item should be classified as a life event in one of the categories;
generating, by the online system, a life event item for the user based on the scores of the plurality of categories outputted from the trained model by:
selecting a particular category from the plurality of categories as a category of the content item based on the scores of the plurality of categories outputted from the trained model, the score of the particular category outputted from the trained model being above a threshold value,
retrieving, by the online system, additional content items based on the score of the particular category outputted from the trained model,
retrieving a life event template, the life event template comprising a plurality of slots associated with different weights,
ranking the additional content items based on the score of the particular category outputted from the trained model, and
placing each of the additional content items into a slot of the plurality of slots of the life event template based on the ranking of the additional content items and the weights of the plurality of slots;
providing, by the online system, the life event item for display to at least some of the user's connections; and
including, by the online system, the content item and interactions with the content item in the positive training set for further training the trained model.

2. The method of claim 1, further comprising:
updating a status of the user in a user profile associated with the user based on the life event in the particular category.

3. The method of claim 1, further comprising:
selecting one or more connections of the user based on an affinity score of the user and each selected connection; and
sending, to the selected one or more connections of the user, a notification that the life event item has been posted by the user in the online system.

4. The method of claim 1, further comprising:
replacing the content item with the generated life event item in user interfaces that display content posted by the user to the user's connections.

5. The method of claim 1, wherein
the interactions with the content item from the user's connections include at least one of the following: comments and reactions, and
the extracted features include at least one of the following: keywords in the content item, keywords in comments, number of comments, types of reactions, and number of reactions.

6. The method of claim 1, wherein generating, by the online system, the life event item for the user based on the scores of the plurality of categories outputted from the trained model further comprises:
receiving the user's selection of a candidate content to be included in the life event item; and
generating the life event item based on the candidate content.

7. The method of claim 1, wherein retrieving, by the online system, the additional content items based on the score of the particular category outputted from the trained model comprises:
selecting, for providing to the user, an animation from a plurality of animations stored by the online system specific to the particular category, the animation representing a theme of the particular category.

8. The method of claim 1, wherein retrieving, by the online system, the additional content items based on the score of the particular category outputted from the trained model comprises:
identifying historical content items received from the user within a predetermined duration before receiving the content item from the user;
determining whether each of the historical content items is relevant to the particular category; and
in response to a determination that a historical content item of the historical content items is relevant to the particular category, identifying the historical content as candidate content.

9. The method of claim 1, wherein retrieving, by the online system, the additional content items based on the score of the particular category outputted from the trained model comprises:
determining a plurality of candidate entities based on the particular category and a user profile associated with the user; and
providing the candidate entities for display to the user in a user interface, the user interface allowing the user to select one of the candidate entities as one of the additional content items.

10. The method of claim 1, wherein generating, by the online system, the life event item for the user based on the scores of the plurality of categories outputted from the trained model further comprises:
including, by the online system, the interactions with the content item and interactions with the candidate content in the life event item.

11. The method of claim 1, wherein generating, by the online system, the life event item for the user based on the scores of the plurality of categories outputted from the trained model further comprises:
placing at least a portion of the content item in a slot of the plurality of slots that is associated with a highest weight.

12. The method of claim 1, wherein at least one of the additional content items is received from the user.

13. The method of claim 1, wherein providing, by the online system, the life event item for display to at least some of the user's connections comprises:
providing to the user a plurality of channels for providing the life event item for display, the plurality of channels including at least one of the following: newsfeed, user profile, story board, email, and message;
receiving selection of one or more of the channels from the user; and
providing the life event item for display through the selected one or more channels.

14. A non-transitory computer readable medium storing executable computer program instructions, the computer program instructions comprising instructions that when executed cause a computer processor to:
receive, by an online system, a content item from a user of the online system;
provide, by the online system, the content item for display to connections of the user within the online system;
receive, by the online system, interactions with the content item from the user's connections;
extract, by the online system, features from the content item and the interactions;
generate, by the online system using a machine learning technique, a trained model by:
forming a positive training set including a first group of content items that have been classified as life events in a plurality of categories and including interactions with the content items in the first group,
forming a negative training set including a second group of content items that have not been classified as life events in any of the plurality of categories and including interactions with the content items in the second group,
extracting training features from the positive training set and the negative training set, and
training the model by using the training features;
input, by the online system, the extracted features into the trained model, the trained model configured to determine a score for each of the plurality of categories, the score indicating whether the content item should be classified as a life event in one of the categories;
generate, by the online system, a life event item for the user based on the scores of the plurality of categories outputted from the trained model by:
select a particular category from the plurality of categories as a category of the content item based on the scores of the plurality of categories outputted from the trained model, the score of the particular category outputted from the trained model being above a threshold value,
retrieve, by the online system, additional content items based on the score of the particular category outputted from the trained model,
retrieve a life event template, the life event template comprising a plurality of slots associated with different weights,
rank the additional content items based on the score of the particular category outputted from the trained model, and
place each of the additional content items into a slot of the plurality of slots of the life event template based on the ranking of the additional content items and the weights of the plurality of slots;

provide, by the online system, the life event item for display to at least some of the user's connections; and include, by the online system, the content item and interactions with the content item in the positive training set for further training the trained model.

15. The computer readable medium of claim 14, wherein the computer program instructions further comprise instructions that when executed cause a computer processor to:

update a status of the user in a user profile associated with the user based on the life event in the particular category.

16. The computer readable medium of claim 14, wherein the computer program instructions further comprise instructions that when executed cause a computer processor to:

select one or more connections of the user based on an affinity score of the user and each selected connection; and send, to the selected one or more connections of the user, a notification that the life event item has been posted by the user in the online system.

17. The computer readable medium of claim 14, wherein the computer program instructions for generating, by the online system, the life event item for the user based on the scores of the plurality of categories outputted from the trained model further comprise instructions that when executed cause the computer processor to:

receive the user's selection of a candidate content to be included in the life event item; and generate the life event item based on the candidate content.

18. The computer readable medium of claim 14, wherein the computer program instructions for providing the life event item for display to at least some of the user's connections comprise instructions that when executed cause the computer processor to:

provide to the user a plurality of channels for providing the life event item for display, the plurality of channels including at least one of the following: newsfeed, user profile, story board, email, and message;

receive selection of one or more of the channels from the user; and provide the life event item for display through the selected one or more channels.

19. A computer system comprising:

a non-transitory computer-readable storage medium storing executable computer program instructions, the computer program instructions comprising instructions that when executed cause a computer processor to perform steps, comprising:

receiving, by an online system, a content item from a user of the online system;

providing, by the online system, the content item for display to connections of the user within the online system;

receiving, by the online system, interactions with the content item from the user's connections;

extracting, by the online system, features from the content item and the interactions;

generating, by the online system using a machine learning technique, a trained model by:

forming a positive training set including a first group of content items that have been classified as life events in at least a subset of the categories and including interactions with the content items in the first group, forming a negative training set including a second group of content items that have not been classified as life events in any of the categories and including interactions with the content items in the second group, extracting training features from the positive training set and the negative training set, and training the model by using the training features;

inputting, by the online system, the extracted features into the trained model, the trained model configured to determine a score for each of a plurality of categories, the score indicating whether the content item should be classified as a life event in one of the categories generating, by the online system, a life event item for the user based on the scores of the plurality of categories outputted from the trained model by:

selecting a particular category from the plurality of categories as a category of the content item based on the scores of the plurality of categories outputted from the trained model, the score of the particular category outputted from the trained model being above a threshold value, retrieving, by the online system, additional content items based on the score of the particular category outputted from the trained model, retrieving a life event template, the life event template comprising a plurality of slots associated with different weights, ranking the additional content items based on the score of the particular category outputted from the trained model, and placing each of the additional content items into a slot of the plurality of slots of the life event template based on the ranking of the additional content items and the weights of the plurality of slots;

providing, by the online system, the life event item for display to at least some of the user's connections; and including, by the online system, the content item and interactions with the content item in the positive training set for further training the trained model.

20. The system of claim 19, wherein the steps further comprise:

updating a status of the user in a user profile associated with the user based on the life event in the particular category.

* * * * *